United States Patent
Miwa et al.

(10) Patent No.: US 11,570,964 B2
(45) Date of Patent: Feb. 7, 2023

(54) PET TOILET SHEET COVER MEMBER AND PET TOILET

(71) Applicant: RICHELL CORPORATION, Toyama (JP)

(72) Inventors: Hisao Miwa, Toyama (JP); Satoshi Urabe, Toyama (JP)

(73) Assignee: RICHELL CORPORATION, Toyama (JP)

( * ) Notice: Subject to any disclaimer, the term of this patent is extended or adjusted under 35 U.S.C. 154(b) by 37 days.

(21) Appl. No.: 16/907,355

(22) Filed: Jun. 22, 2020

(65) Prior Publication Data

US 2021/0360894 A1   Nov. 25, 2021

(30) Foreign Application Priority Data

May 20, 2020   (JP) .............................. JP2020-087796

(51) Int. Cl.
*A01K 1/01*   (2006.01)
*A01K 1/015*   (2006.01)

(52) U.S. Cl.
CPC .......... *A01K 1/0107* (2013.01); *A01K 1/0157* (2013.01)

(58) Field of Classification Search
CPC ............................ A01K 1/0107; A01K 1/0157
See application file for complete search history.

(56) References Cited

U.S. PATENT DOCUMENTS

| | | | |
|---|---|---|---|
| 8,220,622 B1 * | 7/2012 | Lewis ................. | A01K 1/0107 119/168 |
| 9,949,458 B2 * | 4/2018 | Kuiper ................ | A01K 1/0114 |
| 10,219,487 B2 * | 3/2019 | Hasegawa ........... | A01K 1/0107 |
| 2012/0312242 A1 * | 12/2012 | Hillman .............. | A01K 1/0125 119/169 |
| 2017/0318773 A1 | 11/2017 | Hasegawa et al. | |
| 2020/0113364 A1 * | 4/2020 | King .................. | A47G 27/0431 |

FOREIGN PATENT DOCUMENTS

| | | | | |
|---|---|---|---|---|
| JP | 2016-086713 A | 5/2016 | | |
| WO | WO-0015031 A1 * | 3/2000 | ........... | A01K 1/0107 |

* cited by examiner

*Primary Examiner* — Joshua D Huson
*Assistant Examiner* — Alanna K Peterson
(74) *Attorney, Agent, or Firm* — Oblon, McClelland, Maier & Neustadt, L.L.P.

(57) ABSTRACT

[Problem to be solved] To provide a pet toilet sheet cover member that is provided so as to cover a pet toilet sheet laid on a floor surface and can be easily positioned with respect to the pet toilet sheet and can be easily moved, and to provide a pet toilet having the pet toilet sheet cover member.

[Solution] A cover member 1 of a pet toilet sheet 3 according to the present invention includes: a frame member 7 that is provided on the rectangular pet toilet sheet 3 laid on a floor surface so as to over an outer peripheral edge part of the pet toilet sheet 3; and sheet fixing members 9 that are provided on the frame member 7 and fix the pet toilet sheet 3 to the frame member 7. The frame member 7 is formed to have an octagonal outer peripheral shape by obliquely cutting off corner parts of a rectangular shape. The sheet fixing members 9 are respectively provided at the corner parts of the frame member 7, and are structured to respectively fix folded corner parts of the pet toilet sheet 3 to the frame member 7.

6 Claims, 3 Drawing Sheets

PET TOILET SHEET COVER MEMBER AND PET TOILET

TECHNICAL FIELD

The present invention relates to a pet toilet sheet cover member that is provided to cover a pet toilet sheet directly laid on a floor surface, and relates to a pet toilet.

TECHNICAL BACKGROUND

A pet toilet for treating excreta of a pet kept indoor has been designed in which a sheet-like pet toilet sheet capable of absorbing a liquid is directly laid on a floor surface such as flooring and a cover member is placed so as to cover the pet toilet sheet (for example, see Patent Document 1).

The pet toilet sheet cover member disclosed in Patent Document 1 is "a cover member for being placed on a pet toilet sheet and pressing the pet toilet sheet in a state of partially covering the pet toilet sheet, the pet toilet sheet being laid on a floor surface and absorbing excreta of a pet, the cover member comprising: a first end; a second end positioned in a direction opposite to the first end in a horizontal direction; an upper part; and a bottom part, wherein
the bottom part has: a first end region including an edge portion of the first end; a second end region including an edge portion of the second end; and a middle region between the second end region and the first end region,
a first member having a lower surface for being in contact with the floor surface is arranged in the first end region,
a rib having a lower surface for being in contact with at least a portion of an upper surface of the toilet sheet is provided in the middle region, the rib extends from the first end toward the second end, a second member having a lower surface for being in contact with the upper surface of the toilet sheet is provided in the second end region, and the second member is arranged so as to extend along the edge portion of the second end" (see claim 1 of Patent Document 1).

Then, the lower surface of the second member of the pet toilet sheet cover member is in contact with the upper surface of the toilet sheet laid on the floor surface (the second member being arranged so as to extend along the edge part of the second end of the cover member) while the lower surface of the first member of the pet toilet sheet cover member is in contact with the floor surface, and thereby, the first member can prevent shifting between the floor surface and the cover member and shifting between the toilet sheet and the cover member, while the second member can block flow of urine on a top sheet.

RELATED ART

Patent Document

[Patent Document 1] Japanese Patent Application Laid-Open Publication No. 2016-86713.

SUMMARY OF THE INVENTION

Problems to be Solved by the Invention

The pet toilet sheet cover member disclosed in Patent Document 1 is placed so as to cover an entire outer peripheral edge of a toilet sheet laid on a floor surface. Therefore, when the pet toilet sheet cover member is placed, the outer peripheral edge of the toilet sheet is not visible, so it is difficult to place the cover member equally on both sides with respect to the toilet sheet.

Further, the cover member is only placed on the toilet sheet without being connected to the toilet sheet. Therefore, the cover member and the toilet sheet may shift from each other due to kicking or the like by a pet.

Further, there is a problem that, when the toilet is moved, the cover member and the toilet sheet have to be separately held and moved, and then the cover member and the toilet sheet have to be re-positioned relative to each other and placed, so it takes time and effort to move the toilet.

Further, when urine is already present in the toilet sheet, it is difficult to separately move the toilet sheet, so there is also a problem that, when urine is present, moving the toilet is difficult.

The present invention is accomplished to solve the above problem, and is intended to provide a pet toilet sheet cover member that is provided so as to cover a pet toilet sheet directly laid on a floor surface and can be easily positioned with respect to the pet toilet sheet and can be easily moved, and to provide a pet toilet having the pet toilet sheet cover member.

Means for Solving the Problems (1) A pet toilet sheet cover member according to the present invention includes: a frame member that is provided on a rectangular pet toilet sheet laid on a floor surface so as to over an outer peripheral edge part of the pet toilet sheet; and sheet fixing members that are provided on the frame member and fix the pet toilet sheet to the frame member.

The frame member is formed to have an octagonal outer peripheral shape by obliquely cutting off corner parts of a rectangular shape.

The sheet fixing members are respectively provided at the corner parts of the frame member, and are structured to respectively fix folded corner parts of the pet toilet sheet to the frame member.

(2) Further, in the pet toilet sheet cover member according to the above (1), each of the corner parts has: a straight oblique side part forming the each of the corner parts; and protruding parts that are respectively formed at two ends of the oblique side part and each protrude outward in an in-plane direction.

(3) Further, in the pet toilet sheet cover member according to the above (1) or (2), the sheet fixing members each have: a body part of which one side is rotatably attached to the frame member; and a fixing part that is provided on the body part and clamps and fixes a corner part of the pet toilet sheet in cooperation with the frame member.

(4) Further, the pet toilet sheet cover member according to any one of the above (1)-(3) further includes a mesh-like part which is formed in a region surrounded by the frame member and in which small openings are formed in a mesh-like shape.

(5) A pet toilet according to the present invention includes: the pet toilet sheet cover member according to any one of the above (1)-(4); and a pet toilet sheet installed on the pet toilet sheet cover member.

Effect of the Invention

A pet toilet sheet cover member according to the present invention includes: a frame member that is provided on a rectangular pet toilet sheet laid on a floor surface so as to over an outer peripheral edge part of the pet toilet sheet; and sheet fixing members that are provided on the frame member and fix the pet toilet sheet to the frame member. The frame member is formed to have an octagonal outer peripheral shape by obliquely cutting off corner parts of a rectangular shape. The sheet fixing members are respectively provided at the corner parts of the frame member, and are structured to respectively fix folded corner parts of the pet toilet sheet to the frame member. Thereby, an effect is achieved that the frame member and the pet toilet sheet can be easily positioned and can be easily moved.

MODE FOR CARRYING OUT THE INVENTION

Figure 1:
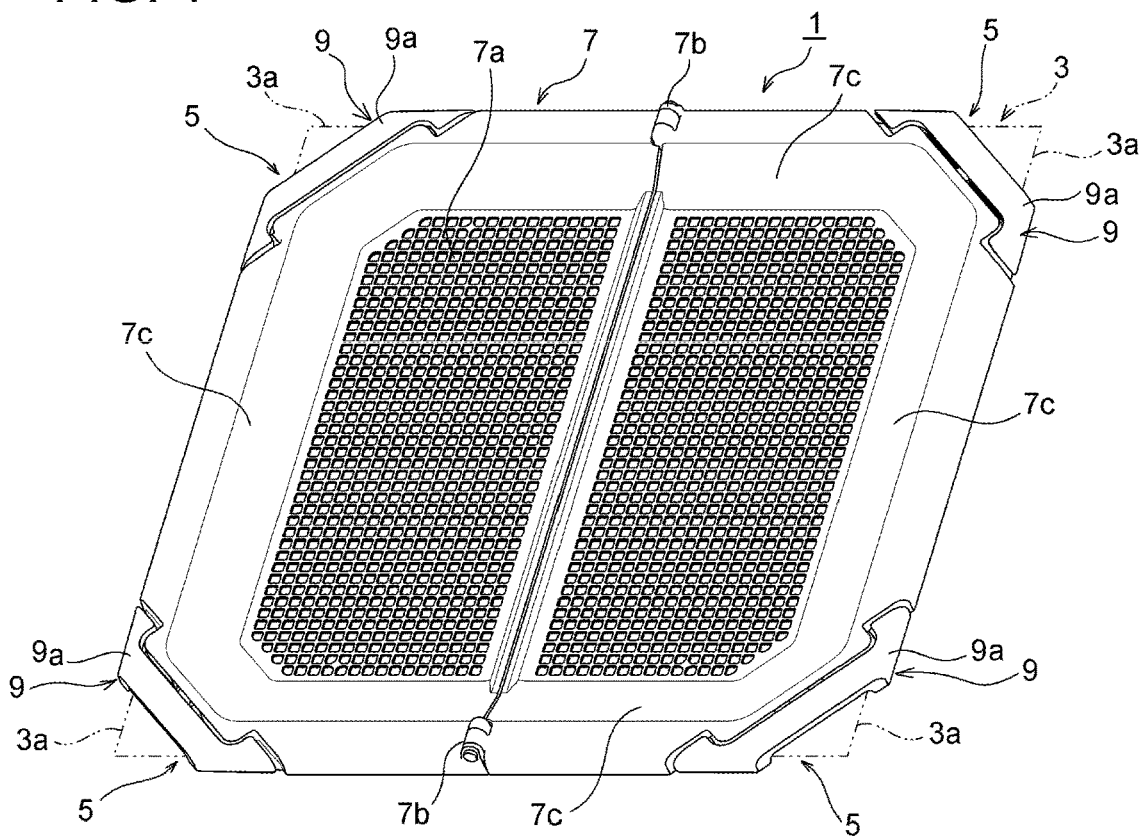
FIG. 1 is a perspective view of an upper surface side of a pet toilet sheet cover member according to an embodiment of the present invention.
Figure 2:
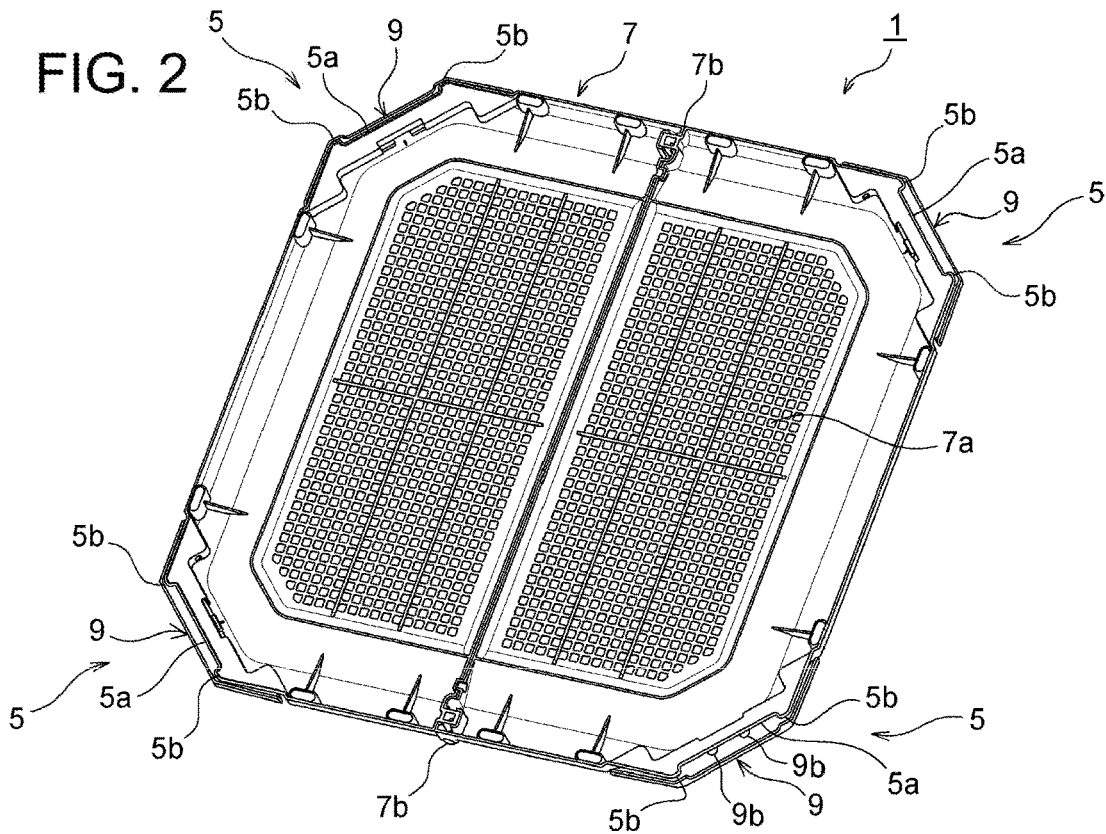
FIG. 2 is a perspective view of a bottom surface side of the pet toilet sheet cover member according to the embodiment of the present invention.
Figure 3:
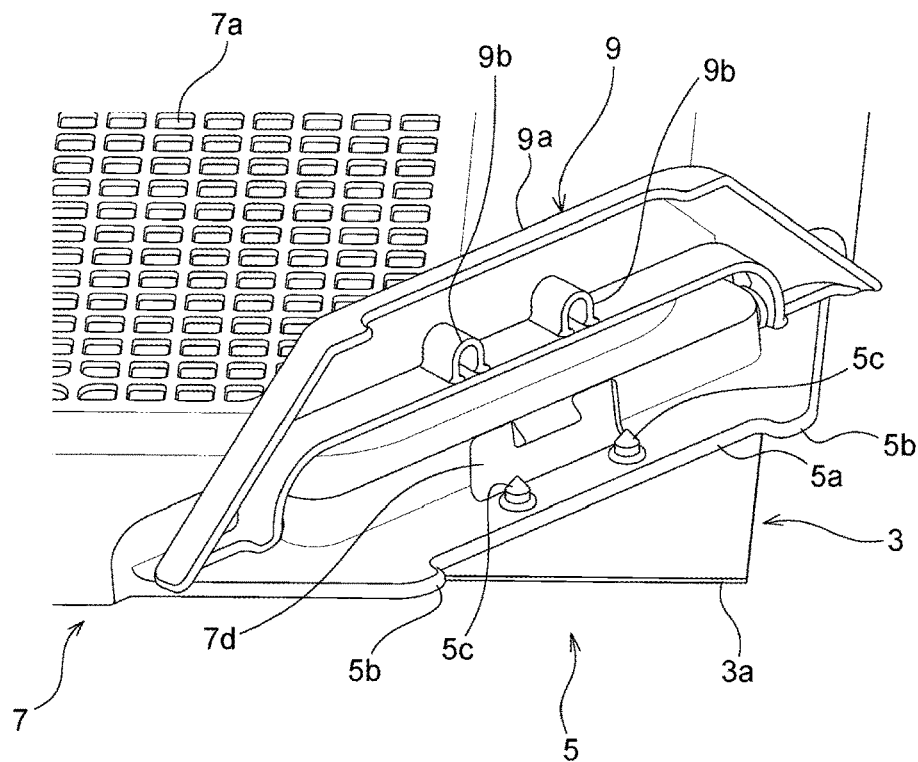
FIG. 3 is an operation explanatory diagram of the pet toilet sheet cover member illustrated in FIG. 1 (Part 1).

As illustrated in FIGS. 1-3, a pet toilet sheet cover member 1 according to the present embodiment includes: a frame member 7 that is provided on a rectangular pet toilet sheet 3 laid on a floor surface so as to cover an outer peripheral edge part of the pet toilet sheet 3; and sheet fixing members 9 that are provided on the frame member 7 and fix the frame member 7 to the pet toilet sheet 3.

In the following, the configuration elements are each described in detail.

<Pet Toilet Sheet>

The pet toilet sheet 3 (hereinafter, may be simply referred to as a "toilet sheet 3") as a subject of the present invention has a rectangular shape, and, as an example of a structure thereof, has a three-layer structure including a liquid-permeable upper sheet, a liquid-impermeable back sheet, and a liquid-absorbing absorbent sheet between the upper sheet and the back sheet.

According to this structure, urine excreted by a pet passes through the upper sheet, and is absorbed by the absorbent sheet, and passing through of the urine is prevented by the back sheet, and the urine is retained in the toilet sheet 3 without soiling the floor surface.

Further, a more preferable structure of the pet toilet sheet 3 is as follows.

The pet toilet sheet 3 is substantially square in a plan view, and includes: the upper sheet that is substantially square in a plan view; the back sheet of the same shape as the upper sheet; and the absorbent sheet that is substantially square in a plan view and is slightly smaller than the upper sheet and the back sheet. The upper sheet and the back sheet overlap each other at outer peripheral edge portions thereof where the absorbent sheet is not present, and the overlapping portions are joined to each other, and thereby, form an outer peripheral edge portion of the pet toilet sheet 3.

As materials of the upper sheet, the back sheet, and the absorbent sheet, for example, as disclosed in Patent Document 1, a liquid-permeable sheet-like material such as a nonwoven fabric is used for the upper sheet, a liquid-impermeable sheet-like material such as a film is used for the back sheet, and, for example, pulp or an absorbent polymer, or a liquid-absorbing material obtained by mixing and molding the pulp and the absorbent polymer is used for the absorbent sheet.

<Frame Member>

As illustrated in FIG. 1, the frame member 7 is formed to have an octagonal outer peripheral shape by obliquely cutting off corner parts 5.

The frame member 7 has a certain width, and has a mountain shape in which a center portion in a width direction is the highest. An inclined surface part (7c) inclined inward is formed on a width direction inner side of the frame member 7.

By providing such an inclined surface part (7c), urine on the inclined surface part (7c) can be allowed to flow into the frame.

On an inner side of the frame member 7, a mesh-like part (7a) is provided in which small openings are formed in a mesh-like shape. The mesh-like part (7a) covers the toilet sheet 3 and thereby, prevents urine from seeping out.

The frame member 7 of the present embodiment is formed by joining two parts divided in a left-right direction with a hinge part (7b), and thus, can be folded in the left-right direction. This has an effect that the frame member 7 can be folded into a compact form when being transported as a product. However, this structure is not essential.

As illustrated in FIG. 3, each of the corner parts 5 of the frame member 7 has a straight oblique side part (5a) forming the each of the corner parts 5, and a pair of protruding parts (5b) that are respectively formed at two ends of the oblique side part (5a) and each protrude outward in an in-plane direction.

The oblique side part (5a) is inclined in a direction of, for example, 135 degrees with respect to an adjacent sides of the frame member 7, and functions as a guide for bending a corner part (3a) of the toilet sheet 3 when the toilet sheet 3 is installed.

Further, the protruding parts (5b) function as a guide for positioning the toilet sheet 3 when the toilet sheet 3 is installed. That is, as illustrated in FIG. 3, when the toilet sheet 3 is installed, correct positioning can be achieved by respectively bringing two ends of a base of a triangle of the toilet sheet 3 protruding from the frame member 7 in contact with inner sides of the protruding parts (5b).

Further, the protruding parts (5b) also have a function of preventing shifting of the toilet sheet 3. That is, when the toilet sheet 3 is installed, since the corner part (3a) of the toilet sheet 3 is folded inward, the folded toilet sheet 3 is prevented from shifting to two sides by the protruding parts (5b).

Further, two protrusions (5c) each having a sharp front end protruding upward are formed in each of the corner parts 5. As will be described later, when the toilet sheet 3 is installed, the protrusions (5c) have a function of fixing the toilet sheet 3 by being respectively fitted into tubular parts (9b) formed on the sheet fixing members 9.

Further, an opening part (7d) for allowing a corner part (3a) of the toilet sheet 3 to be inserted thereinto is provided on a slightly inner side of each of the corner parts 5.

<Sheet Fixing Member>

The sheet fixing members 9 are members that are respectively provided at the corner parts 5 of the frame member 7, and are for fixing the folded corner parts (3a) of the pet toilet sheet 3 to the frame member 7.

The sheet fixing members 9 each have a bottomed frame-shaped body part (9a) having a flat trapezoidal shape in a plan view (see FIG. 1). As illustrated in FIG. 3, a bottom side of the trapezoidal shaped body part (9a) is rotatably attached to the frame member 7 so that the body part (9a) can be opened or closed. The flat state illustrated in FIG. 1 is a state in which the sheet fixing members 9 are closed, and the standing state illustrated in FIG. 3 is a state in which the sheet fixing members 9 are opened.

As illustrated in FIG. 3, two tubular parts (9b) are provided on a back side of each of the sheet fixing members 9. In the state in which the sheet fixing members 9 are closed, the protrusions (5c) formed on the frame member 7 are respectively inserted into the tubular parts (9b). As a result, the sheet fixing members 9 have the function of fixing the toilet sheet 3 in cooperation with the protrusions (5c). The tubular parts (9b) correspond to a fixing part of the present invention.

Next, a method for constructing a pet toilet by installing the pet toilet sheet 3 on the cover member 1 of the pet toilet sheet 3 structured as described above is described based on FIGS. 1 and 3-6.

The frame member 7 is placed on the toilet sheet 3 (see the two-dot chain lines in FIG. 1) directly laid on a floor surface. In this case, the four corner parts 5 of the frame member 7 are cut out and the corner parts (3a) of the toilet sheet 3 can be visually confirmed, and thus, the frame member 7 can be easily placed at a correct position with respect to the toilet sheet 3.

FIG. 1 illustrates the state in which the sheet fixing members 9 are closed. However, when the frame member 7 is placed on the toilet sheet 3 on the floor surface, as illustrated in FIG. 3, the sheet fixing members 9 are put in an opened state. As a result, the protruding parts (5b) of the corner parts 5 of the frame member 7 are in a state of being visible, and, as described above, the protruding parts (5b) have a positioning function, and thus, the positioning of the toilet sheet 3 can be accurately and easily performed.

Figure 4:
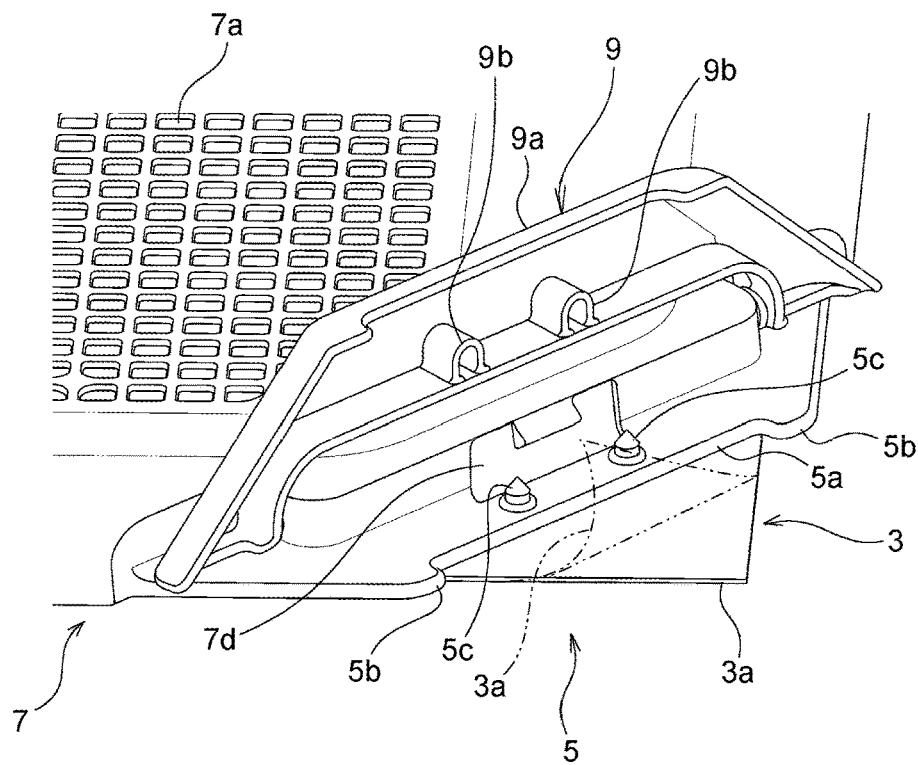
FIG. 4 is an operation explanatory diagram of the pet toilet sheet cover member illustrated in FIG. 1 (Part 2).
Figure 5:
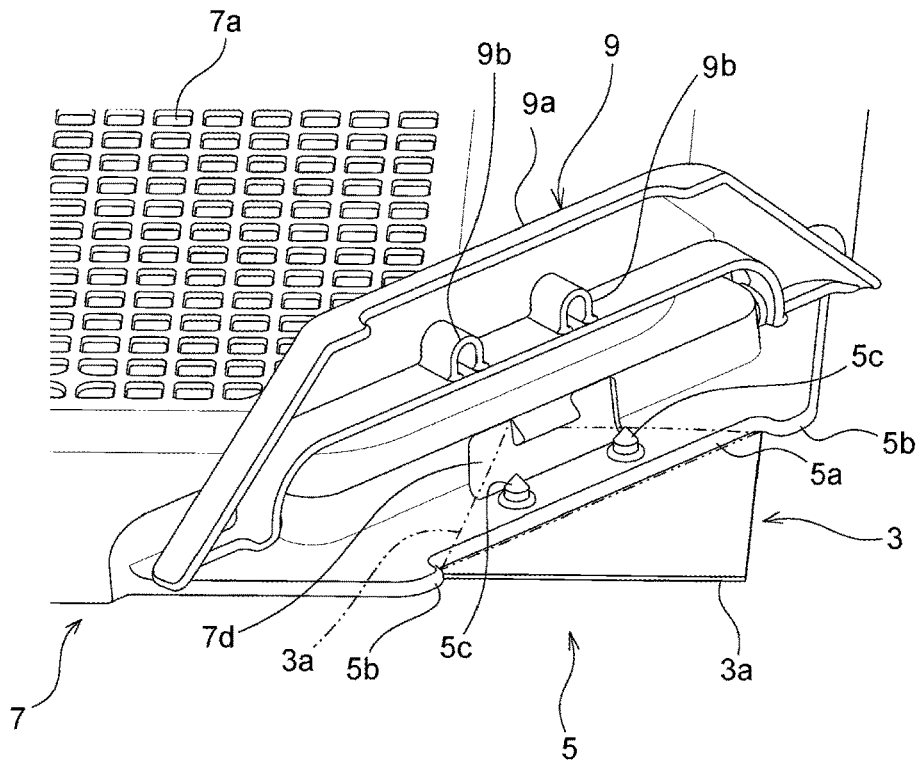
FIG. 5 is an operation explanatory diagram of the pet toilet sheet cover member illustrated in FIG. 1 (Part 3).

After the frame member 7 is placed on the toilet sheet, as illustrated in FIG. 4, the corner part (3a) of the toilet sheet 3 is folded inward, and, as illustrated in FIG. 5, the corner part (3a) is inserted into the opening part (7d) provided in the corner part 5. In this case, by setting a folding line of toilet sheet 3 to be the oblique side part (5a) of the corner part 5, the folded corner part (3a) overlaps the protrusions (5c).

In this state, by closing the sheet fixing member 9, portions of the corner part (3a) of the toilet sheet 3 overlapping the protrusions (5c) are respectively inserted together with the protrusions (5c) into the tubular parts (9b) of the sheet fixing member 9, and the toilet sheet 3 is firmly fixed to the frame member 7.

Figure 6:
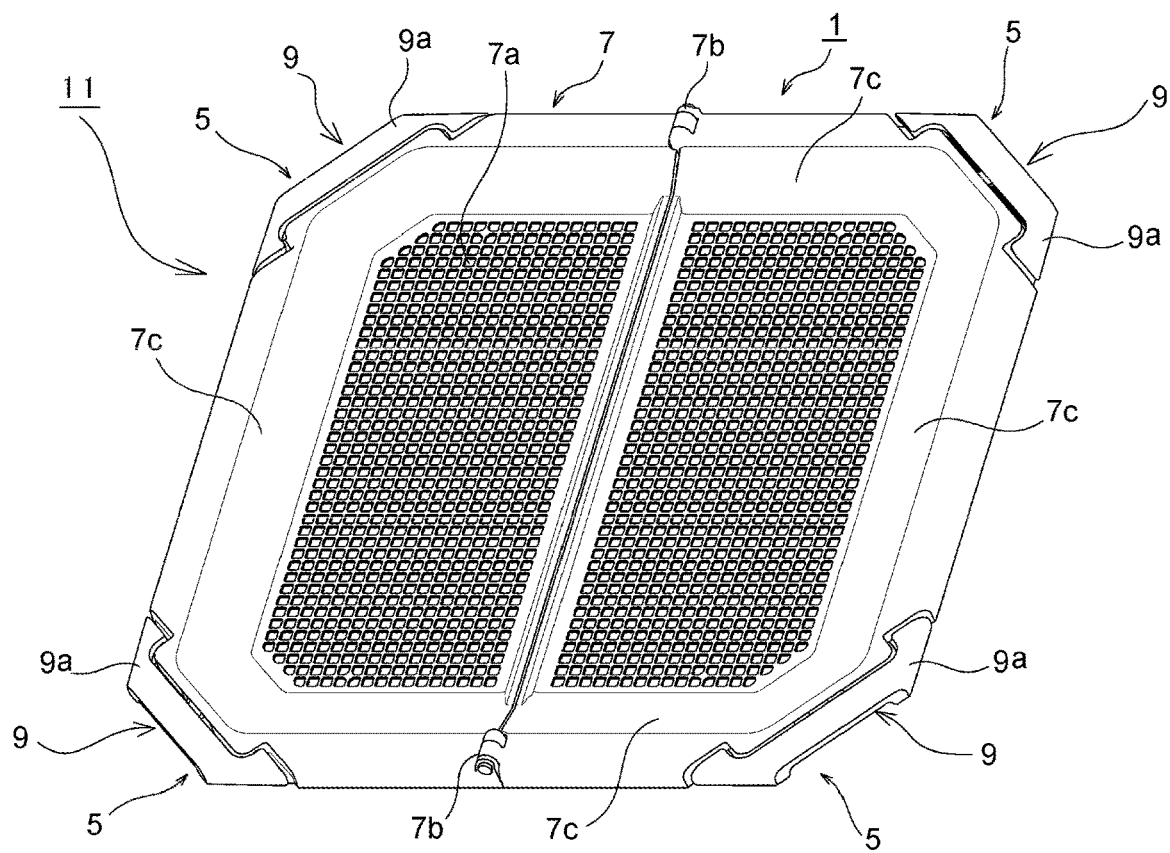
FIG. 6 is a perspective view of a pet toilet according to an embodiment of the present invention.

By performing the above operation in the same manner for the four sheet fixing members 9, the installation of the toilet sheet 3 onto the frame member 7 is completed, and a pet toilet 11 illustrated in FIG. 6 is completed.

In the above pet toilet 11, the toilet sheet 3 is firmly connected to the frame member 7, and thus, the frame member 7 and the toilet sheet 3 do not shift from each other.

Therefore, when the pet toilet 11 is moved, by holding the frame member 7, the toilet sheet 3 can be moved at the same time. Therefore, even when urine is present in the toilet sheet 3, the pet toilet 11 can be easily moved.

As described above, according to the cover member 1 of the pet toilet sheet 3 of the present embodiment, positioning with respect to the toilet sheet 3 directly laid on a floor surface is easy, and, when the pet toilet 11 is formed, the pet toilet 11 can be easily moved.

DESCRIPTION OF REFERENCE NUMERAL SYMBOLS

1: cover member
3: pet toilet sheet
3a: corner part
5: corner part
5a: oblique side part
5b: protruding part
5c: protrusion
7: frame member
7a: mesh-like part
7b: hinge part
7c: inclined surface part
7d: opening part
9: sheet fixing member
9a: body part
9b: tubular part
11: pet toilet

The invention claimed is:

1. A pet toilet, comprising:
   a pet toilet sheet cover member;
   a frame member that is provided above a rectangular pet toilet sheet laid above a floor surface to cover an outer peripheral edge part of the pet toilet sheet; and
   sheet fixing members that are respectively provided at corner parts of the frame member and fix the pet toilet sheet to the frame member, wherein
   the frame member includes, at each of the corner parts, a straight oblique side part functioning as a guide for folding a corner part of the pet toilet sheet when the pet toilet sheet is installed, and
   the sheet fixing members
      each have a body part of which one side is rotatably attached to the frame member, and a fixing part that is provided on the body part and clamps and fixes the corner part of the pet toilet sheet in cooperation with the frame member, and
      are structured to respectively fix folded corner parts of the pet toilet sheet, by setting the oblique side part as a folding line, to the frame member such that the folded corner parts of the pet toilet sheet are provided above the frame member and below the sheet fixing members, wherein the frame member is provided above the pet toilet sheet laid above the floor surface.

2. The pet toilet according to claim 1, wherein each of the corner parts has
   protruding parts that are respectively formed at two ends of the oblique side part and each protrude outward in an in-plane direction.

3. A pet toilet, comprising:
   the pet toilet sheet cover member according to claim 2; and
   the pet toilet sheet installed below the pet toilet sheet cover member.

4. The pet toilet according to claim 1, further comprising a mesh-like part which is formed in a region surrounded by the frame member and in which small openings are formed in a mesh-like shape.

5. A pet toilet, comprising:
   the pet toilet sheet cover member according to claim 4; and the pet toilet sheet installed below the pet toilet sheet cover member.

6. A pet toilet, comprising:

the pet toilet sheet cover member according to claim 1; and the pet toilet sheet installed below the pet toilet sheet cover member.

* * * * *